US007228682B2

(12) United States Patent
Kashler

(10) Patent No.: US 7,228,682 B2
(45) Date of Patent: Jun. 12, 2007

(54) SYSTEM FOR AUGMENTED ELECTRIC POWER GENERATION WITH DISTILLED WATER OUTPUT

(76) Inventor: Yefim Kashler, 213 Bay 26 St., Brooklyn, NY (US) 11214

( * ) Notice: Subject to any disclaimer, the term of this patent is extended or adjusted under 35 U.S.C. 154(b) by 410 days.

(21) Appl. No.: 11/012,319

(22) Filed: Dec. 16, 2004

(65) Prior Publication Data

US 2006/0130487 A1    Jun. 22, 2006

(51) Int. Cl.
*F02C 6/18* (2006.01)
(52) U.S. Cl. ..................... 60/39.182; 60/728
(58) Field of Classification Search ............ 60/39.182, 60/39.511, 728, 772
See application file for complete search history.

(56) References Cited

U.S. PATENT DOCUMENTS

| 4,209,364 | A |   | 6/1980  | Rothschild |              |
|-----------|---|---|---------|------------|--------------|
| 4,282,070 | A |   | 8/1981  | Egosi      |              |
| 4,350,571 | A |   | 9/1982  | Erickson   |              |
| 4,379,734 | A |   | 4/1983  | Franzen    |              |
| 4,678,587 | A |   | 7/1987  | Voinche et al. |          |
| 5,227,027 | A |   | 7/1993  | Topper     |              |
| 5,294,303 | A |   | 3/1994  | Robbins    |              |
| 5,366,514 | A |   | 11/1994 | Becnel, Jr. et al. |      |
| 5,695,614 | A |   | 12/1997 | Hording et al. |          |
| 5,724,807 | A | * | 3/1998  | Schuetzenduebel et al. ............ 60/39.464 |
| 6,010,599 | A |   | 1/2000  | Wang et al. |             |
| 6,374,591 | B1| * | 4/2002  | Johnson et al. ............... 60/783 |
| 6,470,686 | B2| * | 10/2002 | Pierson ........................ 60/772 |
| 6,578,354 | B2| * | 6/2003  | Hatamiya et al. ........ 60/39.511 |
| 6,584,776 | B2| * | 7/2003  | Mittricker et al. ............ 60/775 |
| 6,584,793 | B2| * | 7/2003  | Fukushima et al. ........ 62/238.3 |
| 6,588,196 | B1| * | 7/2003  | Bahr et al. ................ 60/39.182 |
| 6,739,119 | B2| * | 5/2004  | Erickson ..................... 60/39.53 |
| 6,769,258 | B2| * | 8/2004  | Pierson ........................ 60/772 |
| 7,007,453 | B2| * | 3/2006  | Maisotsenko et al. ... 60/39.511 |
| 2001/0020360 | A1 | * | 9/2001 | Tsukamoto et al. ........ 60/39.53 |
| 2003/0029157 | A1 | * | 2/2003 | Utamura ..................... 60/39.53 |
| 2003/0051496 | A1 | * | 3/2003 | Fukushima et al. ........ 62/238.3 |
| 2003/0070415 | A1 | * | 4/2003 | Hatamiya et al. ........ 60/39.511 |
| 2003/0074901 | A1 | * | 4/2003 | Bellac et al. ................. 60/772 |
| 2006/0162316 | A1 | * | 7/2006 | Tanaka et al. ............ 60/39.511 |
| 2007/0039307 | A1 | * | 2/2007 | Hatamiya et al. ........ 60/39.511 |

* cited by examiner

*Primary Examiner*—William H. Rodriguez
(74) *Attorney, Agent, or Firm*—Richard C. Litman

(57) ABSTRACT

The system for augmented electric power generation with distilled water output employs a combined cycle gas turbine power generation system for electrical power generation. A multistage evaporator uses steam drawn from the steam turbine as a heating medium to power the multistage evaporator for the production of distilled water. Residual steam output from the multistage evaporator is used as an energy source for an absorption refrigeration unit. The absorption refrigeration unit simultaneously preheats wastewater supplied to the multistage evaporator and provides chilled water to cool intake air for the combined cycle gas turbine power generation system. Thus, the system's efficiency is increased because the preheating of the wastewater supply to the multistage evaporator improves efficiency of the distillation process, while cooling of the gas turbine intake air increases power generated by the gas turbine, increasing both power and steam output from the combined cycle gas turbine power generation system.

14 Claims, 4 Drawing Sheets

SYSTEM FOR AUGMENTED ELECTRIC POWER GENERATION WITH DISTILLED WATER OUTPUT

BACKGROUND OF THE INVENTION

1. Field of the Invention

The present invention relates to electric power generation. More specifically, the present invention is a system for augmented electric power generation with distilled water output. An absorption refrigeration unit enhances the efficiency of the system by both preheating wastewater prior to distillation, and cooling intake air to a gas turbine electric power generator to increase the power output of the gas turbine.

2. Description of the Related Art

In the generation of electrical power, efficiency is desired to maximize the benefit extracted from a given amount of fuel or energy input into the power generating system. Efficiency may be gained by both reducing the amount of energy lost in the electrical power generation process and by recovering lost energy to power other processes.

In numerous electrical power generating systems, the primary form of energy used to drive electrical generators, or the primary energy by-product, is heat. In a typical example, a gas turbine is used to drive an electrical generator. A fuel source is combusted to drive the gas turbine, and the combustion by-products, primarily hot combustion gasses, are discharged.

Often, the hot combustion gasses are used as an energy source to drive an additional process. In the case of a combined cycle gas turbine power generation system, the combustion gasses, or flue gasses, are used in a heat recovery steam generator to generate steam that is used to drive a steam turbine for the generation of additional electrical power. Steam so created may also be used for another industrial process, such as a distillation or evaporative process where the heat energy of the steam itself, rather than electric power or another intermediate energy form, is directly used by the industrial process.

At some point, however, a surplus of heat energy usually remains as a waste product. Additionally, heat energy withdrawn from the initial process may result in a loss of the output of the initial process.

In a combined cycle gas turbine power generation system, employing steam drawn from the combined cycle power generation system to power a distillation process to produce purified, distilled water, excess heat from the steam turbine is used in an evaporator or distillation system. After the distillation process, however, residual heat energy is wasted. It is desirable to capture the wasted residual heat energy in a useful manner such that the residual heat energy can be re-introduced into the system for an overall increase in system output and efficiency.

Thus a system for augmented electric power generation with distilled water output solving the aforementioned problems is desired.

SUMMARY OF THE INVENTION

To minimize steam consumption and increase overall system efficiency, the system for augmented electric power generation with distilled water output employs a multistage evaporator to produce distilled water from a water source such as municipal or industrial wastewater, seawater, or another untreated water source suitable for distillation. The distilled water output may be used as a potable water supply for a municipal water distribution system, used as make-up water for steam generators, or used in other applications for distilled water.

In a typical configuration for a combined cycle gas turbine power generation system, steam is drawn from between a high-pressure cylinder and a low-pressure cylinder of a steam turbine for use as a heating medium for the multistage evaporator. Flue gasses from a gas turbine are used, in a heat recovery steam generator (HRSG), to generate steam for the steam turbine. Thus, steam generated by the combined cycle gas turbine power generation system is used in the multistage evaporator to distill water from a wastewater source.

An absorption refrigeration unit improves the efficiency of the system for augmented electric power generation with distilled water output. The absorption refrigeration unit simultaneously preheats the wastewater supply to the multistage evaporator and provides chilled water to cool intake air for the gas turbine. The absorption refrigeration unit uses residual steam exiting the multistage evaporation unit as an energy source to chill water using an absorption refrigeration cycle. The chilled water is used to cool inlet air to the gas turbine. The cooled inlet air, having a higher density, increases the power output of the gas turbine because of the increased mass flow through the gas turbine. The increased power output also results in an increase in flue gasses emitted from the gas turbine and entering the HRSG, and the HRSG is able therefore to generate a greater amount of steam to make up for the steam removed between the high- and low-pressure steam turbine cylinders.

Wastewater is preheated in an absorber and condenser within the absorption refrigeration unit prior to entry of the wastewater into the multistage evaporator, thereby increasing the efficiency of the wastewater distillation by the system for augmented electric power generation with distilled water output.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
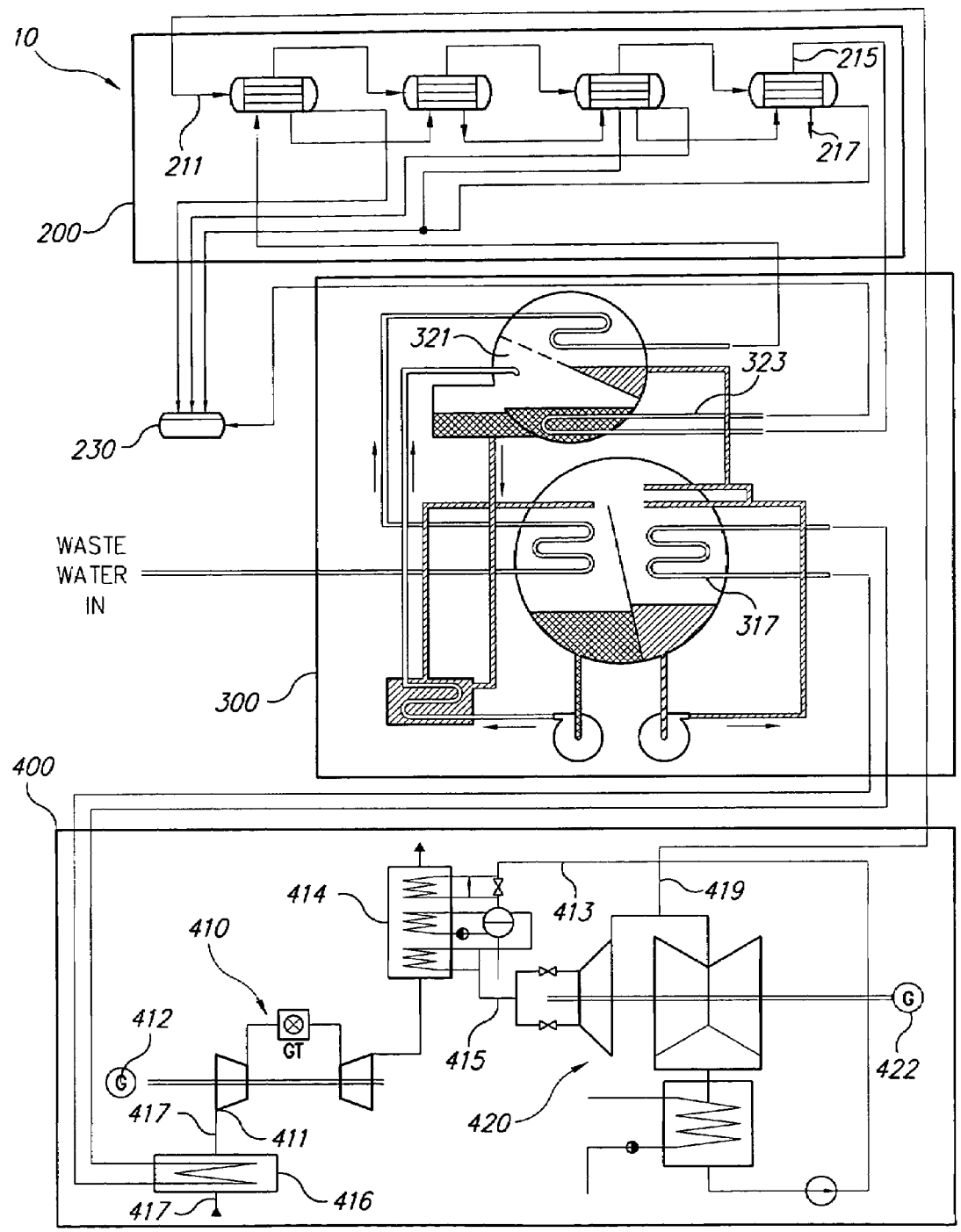
FIG. 1 is a schematic diagram of a system for augmented electric power generation with distilled water output according to the present invention.

The present invention a system for augmented electric power generation with distilled water output. Referring to FIG. 1, an illustrated embodiment of a system for augmented electric power generation with distilled water output, designated generally as 10, employs a combined cycle gas turbine power generation system 400 for electrical power generation. The combined cycle gas turbine power generation system 400 includes a gas turbine 410 driving a first electric power generator 412, and a steam turbine 420 driving a second electric power generator 422.

A multistage evaporator 200 uses steam drawn from a generated steam source 419 of the combined cycle gas turbine power generation system 400 as a heating medium to power the multistage evaporator 200 for the distillation of a wastewater supply such as municipal or industrial wastewater, seawater, or another untreated water source. Steam taken from the steam source 419 enters a primary steam input 211 of the multistage evaporator 200.

Residual steam output from the multistage evaporator 200, exiting a secondary steam output 215, is used as an energy source for an absorption refrigeration unit 300, the steam from the secondary steam output 215 passing through generator tubing 323 in a generator unit 321 of the absorption refrigeration unit 300. The absorption refrigeration unit 300 simultaneously preheats wastewater supplied to the multistage evaporator 200 and chills water that is circulated through a heat exchanger 416, cooling inlet air entering the compressor air intake 411 of the gas turbine 410. Thus, the efficiency of the system for augmented electric power generation with distilled water output 10 is increased because the preheating of the wastewater supply to the multistage evaporator 200 improves the efficiency of the distillation process, while the cooling of intake air to the gas turbine 410 increases the power generated by the gas turbine 410, increasing both power and steam output from the combined cycle gas turbine power generation system 400.

Figure 2:
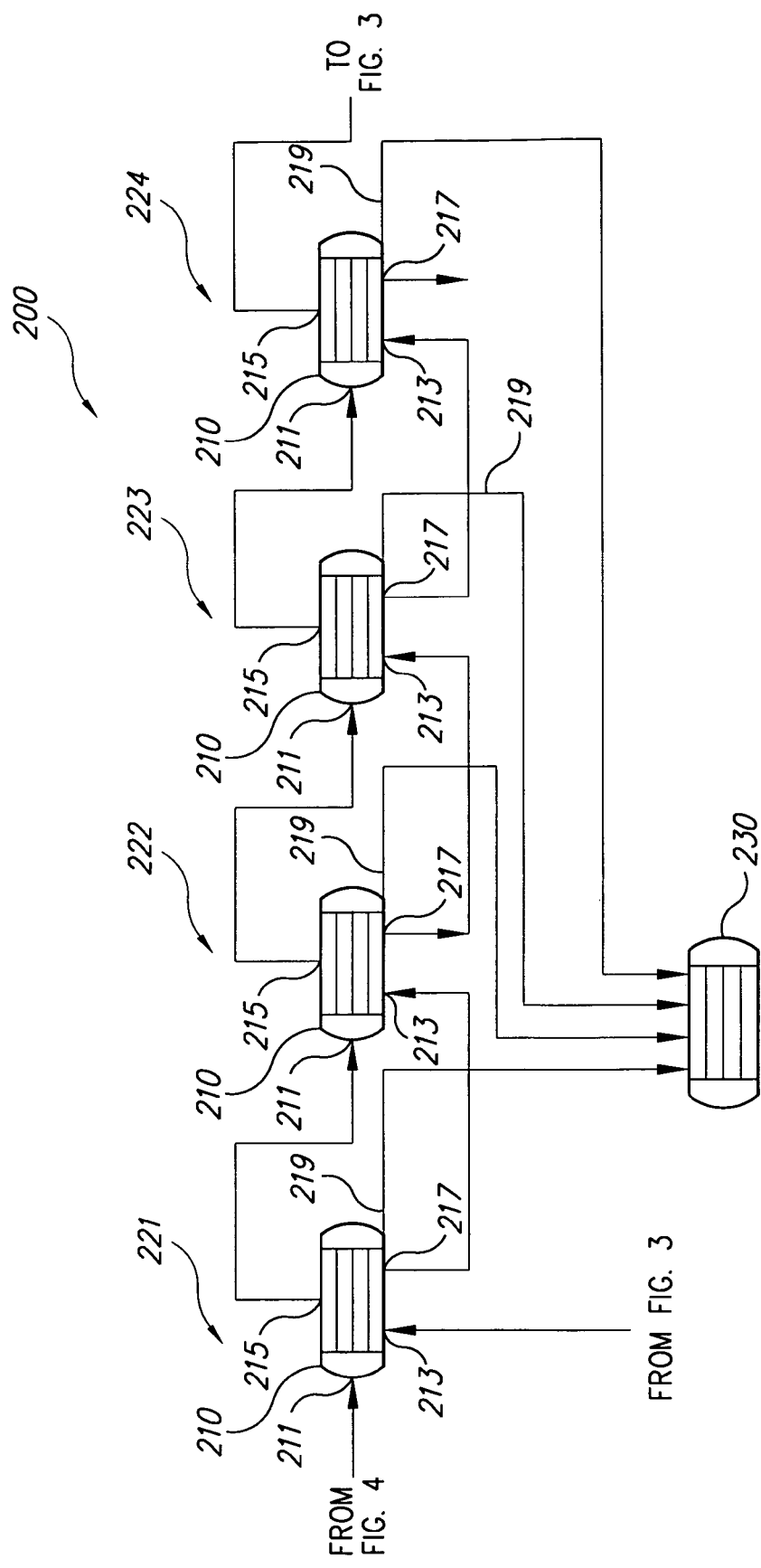
FIG. 2 is a schematic diagram of a multistage evaporator in a system for augmented electric power generation with distilled water output according to the present invention.

Referring to FIGS. 1 and 2, the multistage evaporator 200 is described in greater detail. In the illustrated embodiment, the multistage evaporator 200 employs four (4) shell-and-tube type evaporator units 210 or stages in a cascaded four-stage arrangement. It can be recognized that a multistage evaporator 200 may be employed utilizing both a different type and number of evaporator units 210. Each evaporator unit 210 has a steam input 211 and a wastewater input 213, as well as a secondary steam output 215, a wastewater output 217, and a condensate output 219. Steam entering the steam input 211 of an evaporator unit 210 is designated "primary steam" for the evaporator unit 210. The primary steam entering steam input 211 of an evaporator unit 210 evaporates a quantity of wastewater that enters the evaporator unit's 210 wastewater input 213. Wastewater is evaporated in each evaporator unit 210, by the heat from the primary steam, and condensed to produce distilled water exiting the condensate output 219 of the evaporator unit 210. Secondary steam, at somewhat lower pressure and temperature, exits the steam output 215 of the evaporator unit 210. Concentrated wastewater not evaporated and distilled within the evaporator unit 210 exits evaporator unit's 210 wastewater output 217.

In the multistage evaporator 200, evaporator units 210 are cascaded together so that secondary steam exiting the steam output 215 of a first stage 221 evaporator unit 210 enters the steam input 211 of a second stage 222 evaporator unit 210. Similarly, wastewater exiting the wastewater output 217 of the first stage 221 evaporator unit 210 enters the wastewater input 213 of the second stage 222 evaporator unit 210. In the illustrated embodiment, third stage 223 and fourth stage 224 evaporator units 210 are similarly cascaded. Condensate is collected from the condensate output 219 of each of the evaporator units 210 in a condensate receiver 230.

It can be seen that, as heat is extracted from steam at each stage of the multistage evaporator 200, wastewater is evaporated in each stage. Thus, while steam entering each subsequent evaporator unit 210 contains less thermal energy than in the previous stage each subsequent evaporator unit 210 contributes efficiently to the distilled water production. The more evaporator stages, or evaporator units 210, are used, the more distillate is obtained, and less steam drawn from the power generation system 400. In a typical configuration, primary steam enters the steam input 211 of the first stage 221 evaporator unit 210 between about four hundred and fifty (450) and five hundred (500) degrees Fahrenheit, while secondary steam exiting the steam output 215 of the fourth stage 224 evaporator unit 210 is about two hundred (200) to three hundred (300) degrees.

Figure 3:
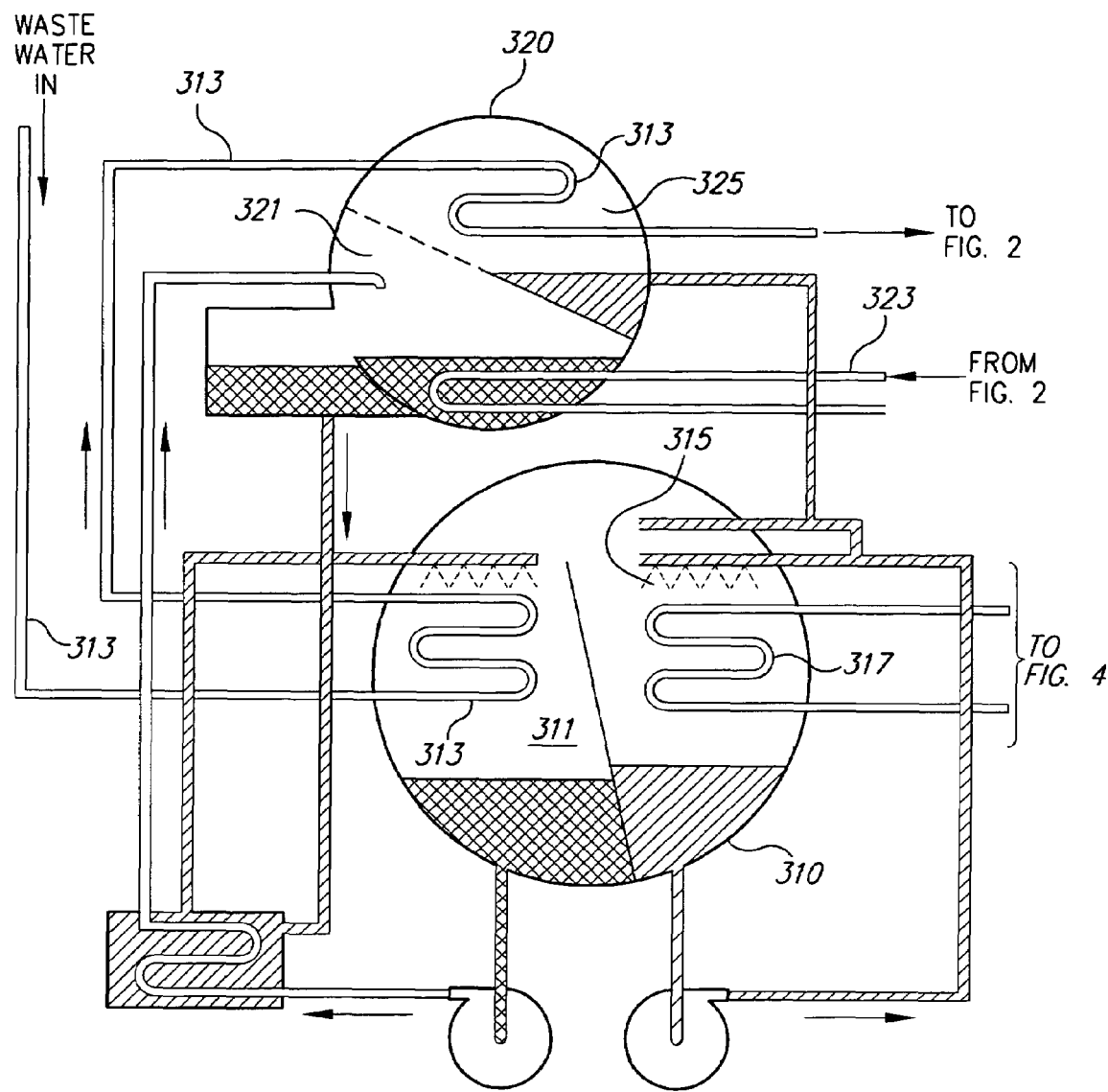
FIG. 3 is a schematic diagram of an absorption refrigeration unit in a system for augmented electric power generation with distilled water output according to the present invention.

Because the secondary steam exiting the last stage (the fourth stage 224 of the illustrated embodiment) evaporator unit 210 of the multistage evaporator 200 retains significant enthalpy, it can be used as an energy source returned into the system for augmented electric power generation with distilled water output 10 to increase the system's overall efficiency. Referring now to FIGS. 1 and 3, the steam exiting the multistage evaporator 200 is used as a heating source in the generator 321 of the absorption refrigeration unit 300. The absorption refrigeration unit 300 uses heat energy from the steam exiting the multistage evaporator 200 to chill water that is used, in turn, to cool intake air to the gas turbine 410 of the combined cycle gas turbine power generation system 400, thereby increasing the electric power output and steam output from the combined cycle gas turbine power generation system 400. An additional function of the absorption refrigeration unit 300 is to pre-heat wastewater supplied to the multistage evaporator 200.

The absorption refrigeration unit 300 is of a generally conventional configuration, employing an absorber/evaporator unit 310, where a refrigerant is vaporized in an evaporator 315 to chill water circulated through a chilling circuit of tubes 317 within the evaporator 315. Water is conventionally used as a refrigerant in an absorption refrigeration unit 300. The refrigerant vapors, produced under vacuum in the evaporator 315, are absorbed by an absorbent, such as lithium bromide or lithium chloride, within the absorber 311 of the absorber/evaporator unit 310. The absorbent, laden with absorbed refrigerant, is pumped into the generator 321, which, depending on the desired efficiency, can be a single or multiple stage generator, of a generator/condenser unit 320 of the absorption refrigeration unit 300. Within the generator 321, the absorbent is heated to drive the refrigerant out of the absorbent and back into a vapor state. The refrigerant vapors enter a condenser 325 of the generator/condenser unit 320, where the refrigerant is condensed back into a liquid state for reuse in the evaporator 315.

The heat source for the generator 321 is steam, provided from the multistage evaporator 200, passing through generator tubing 323 in the generator 321. Wastewater is circulated through a preheating circuit of tubing 313 that runs through the absorber 311 and the condenser 325, where heat is transferred to the wastewater. Thus, wastewater is preheated by the absorption refrigeration unit 300 in the process of producing chilled water. The wastewater is then delivered to the multistage evaporator 200 for distillation. Because of the preheating of the wastewater by the absorption refrigeration unit 300, the wastewater distillation proceeds with greater efficiency.

Figure 4:
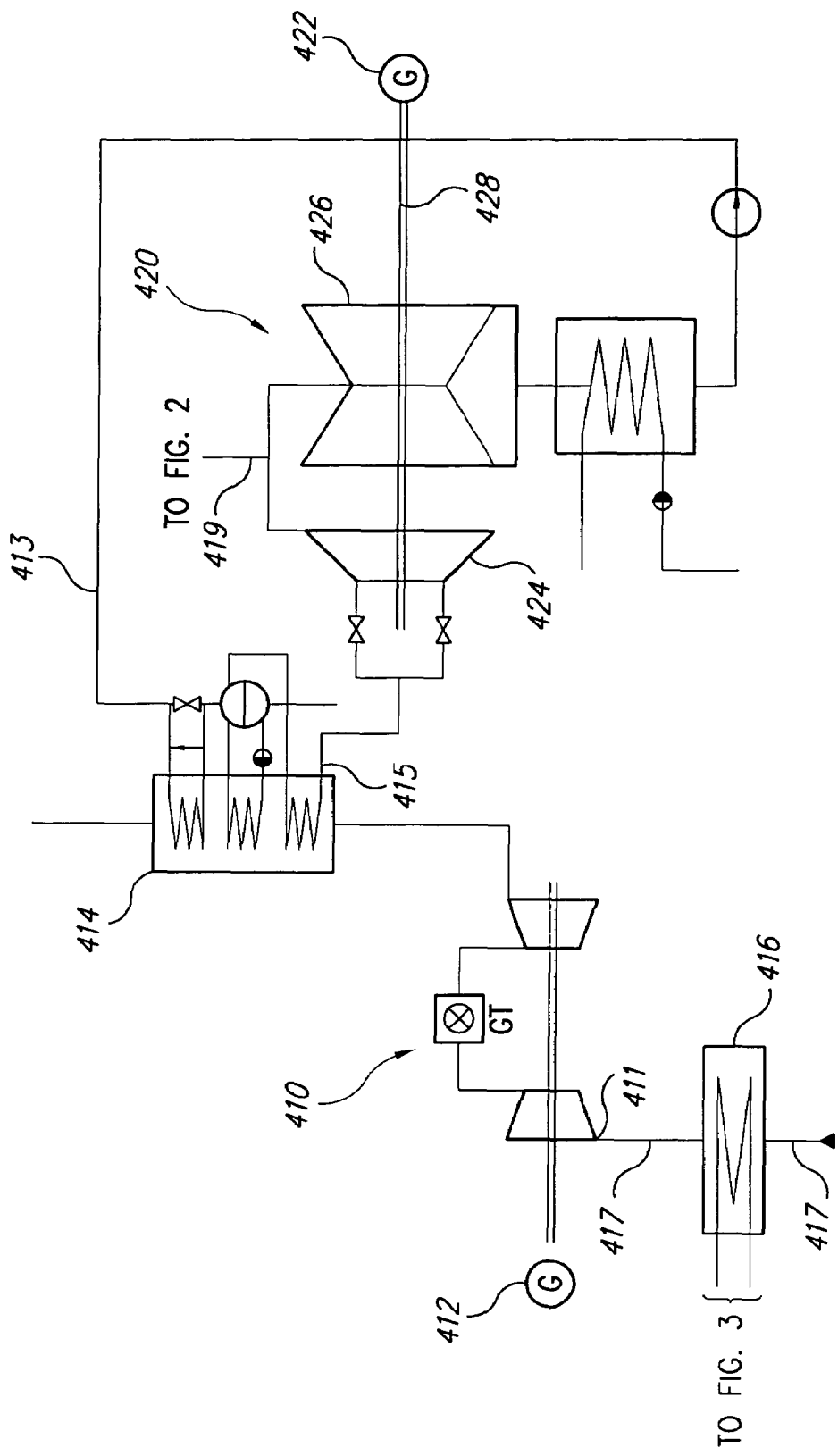
FIG. 4 is a schematic diagram of a combined cycle gas turbine power generation unit in a system for augmented electric power generation with distilled water output according to the present invention.

Referring now to FIGS. 1 and 4, the chilled water produced by the absorption refrigeration unit 300 is circulated through a heat exchanger 416 in a closed circuit to cool air entering the compressor air intake 411 of the gas turbine 410 of the combined cycle gas turbine power generation system 400. The heat exchanger 416 is disposed in an air-flow path 417 of air entering the compressor air intake 411 of the gas turbine 410.

In a typical combined cycle gas turbine power generation system 400, a gas turbine 410 drives a first electrical power generator 412. Flue gasses from the gas turbine 410 are used in a heat recovery steam generator (HRSG) 414 to produce steam, which is then used to power a steam turbine 420, which drives a second electrical power generator 422. The HRSG 414 has a water input 413 through which source water enters the HRSG 414, and a steam output 415 through which steam exits. In the illustrated configuration, the steam turbine employs a high-pressure turbine 424 and a low-pressure turbine 426 together on a single shaft 428. Steam generated by the HRSG 414 drives the high-pressure turbine 424, while steam exiting the high-pressure turbine 424, at a lower pressure, is used to drive the low-pressure turbine 426.

The absorption refrigeration unit 300 cools water to about forty (40) degrees Fahrenheit, which is sufficient to cool the intake air the of gas turbine 410 to between forty five (45) and forty eight (48) degrees Fahrenheit. Because of the greater density of the intake air, and the resulting greater mass flow through the gas turbine 410, the gas turbine 410, depending on the ambient temperature, generates up to twenty-five (25) percent greater power output, which is known as inlet cooling type power augmentation. Additionally, a greater exhaust flow from the gas turbine 410 increases the amount of steam produced in the HRSG 414.

Steam is drawn from the combined cycle gas turbine power generation system 400 as a heating medium to power the wastewater distillation process of the multistage evaporator 200. The steam may be drawn directly from the HRSG 414, or from the steam turbine 420 between the high-pressure turbine 424 and the low-pressure turbine 426. In the illustrated embodiment, steam is drawn from a steam source 419 between the high-pressure turbine 424 and the low-pressure turbine 426. It can be recognized that the system for augmented electric power generation with distilled water output 10 may employ a simple cycle gas turbine power generation system instead of the combined cycle gas turbine power generation system 400, drawing steam directly from a separate steam generator. Additionally, in an alternative arrangement, a Rankine cycle steam turbine power generator may be employed, using a conventional boiler or other method of generating steam instead of the gas turbine 410 and HRSG 414.

It is to be understood that the present invention is not limited to the embodiments described above, but encompasses any and all embodiments within the scope of the following claims.

I claim:

1. A system for augmented electric power generation with distilled water output, comprising:
   a gas turbine power generation system having a gas turbine and a first electric power generator, the gas turbine driving the first electric power generator, the gas turbine having an air intake and an exhaust output;
   a heat recovery steam generator having a flue gas input, a water input, and an HRSG steam output, the flue gas input being in communication with said exhaust output, wherein the heat recovery steam generator uses said exhaust output to convert water into steam;
   a multistage evaporator having a primary steam input, a wastewater input, a secondary steam output, and at least one condensate output, the primary steam input being in communication with said HRSG steam output, wherein wastewater entering the wastewater input is evaporated by heat from the steam entering the steam input and condensed, the condensate exiting the condensate output as distilled water;
   an absorption refrigeration unit having a steam input, a preheating circuit having a preheating input and a preheating output, and a chilling circuit having a chilling input and a chilling output, the steam input being in communication with said secondary steam output, the preheating output being in communication with said wastewater input, the preheating input being connected to a wastewater source;
   an air cooling heat exchanger disposed in a closed fluid circuit between said chilling input and chilling output, the air cooling heat exchanger being disposed in the air flow path of said air intake.

2. The system for augmented electric power generation with distilled water output according to claim 1, wherein said gas turbine power generation is a combined cycle gas turbine power generation further comprising a steam turbine and a second electric power generator, the steam turbine driving the second electric power generator, the steam turbine having a turbine steam input in communication with said HRSG steam output and a turbine steam output in communication with said primary steam input, wherein steam entering the turbine steam input from the HRSG steam output drives the steam turbine and exits the turbine steam output.

3. The system for augmented electric power generation with distilled water output according to claim 2, wherein said steam turbine comprises a high-pressure turbine and a low pressure turbine, said turbine steam output drawing steam from between the high-pressure turbine and the low-pressure turbine.

4. The system for augmented electric power generation with distilled water output according to claim 1, wherein said multistage evaporator comprises a plurality of cascaded evaporator units, each of the evaporator units having primary steam input, a wastewater input, a secondary steam output, a wastewater output, and a condensate output.

5. The system for augmented electric power generation with distilled water output according to claim 4, wherein said evaporator units are shell and tube type evaporator units.

6. A system for augmented electric power generation with distilled water output, comprising:
   means for employing a gas turbine having an air intake to generate electrical power and a steam source;
   evaporator means for employing said steam source to distill a wastewater source and to produce a secondary steam source;
   means for employing said secondary steam source to preheat said wastewater source and to cool air entering said air intake.

7. The system for augmented electric power generation with distilled water output according to claim 6, wherein said evaporator means comprises a plurality of cascaded evaporator units, each of the evaporator units having primary steam input, a wastewater input, a secondary steam output, a wastewater output, and a condensate output.

8. The system for augmented electric power generation with distilled water output according to claim 7, wherein said evaporator units are shell and tube type evaporator units.

9. A method for producing electrical power and distilled water, comprising the steps of:
   employing a gas turbine, the gas turbine having an air intake, to drive a first electric power generator, while employing exhaust gasses from the gas turbine in a heat recovery steam generator to generate steam;

employing said steam in a multistage evaporator to distill a wastewater source;

employing secondary steam from the multistage evaporator in an absorption refrigeration unit to preheat said wastewater source and to produce chilled water; and employing said chilled water to cool air entering said gas turbine for combustion, thereby increasing the density of the air and increasing the power and heat output of said gas turbine.

10. The method for producing electrical power and distilled water according to claim 9, wherein said gas turbine is configured in a combined cycle gas turbine power generation system.

11. The method for producing electrical power and distilled water according to claim 10, wherein said combined cycle gas turbine power generation system includes a steam turbine and a second electric power generator driven by the steam turbine, wherein a portion of said steam is employed to drive the steam turbine.

12. The method for producing electrical power and distilled water according to claim 9, wherein said multistage evaporator comprises a plurality of cascaded evaporator units, each of the evaporator units having primary steam input, a wastewater input, a secondary steam output, a wastewater output, and a condensate output.

13. The method for producing electrical power and distilled water according to claim 12, wherein said evaporator units are shell and tube type evaporator units.

14. The method for producing electrical power and distilled water according to claim 9, wherein said chilled water is cycled through an air cooling heat exchanger disposed in the air flow path of said air intake.

* * * * *